United States Patent
Meerwald et al.

(10) Patent No.: US 7,738,126 B2
(45) Date of Patent: Jun. 15, 2010

(54) METHOD FOR GENERATING DISK LABEL PRINT DATA

(75) Inventors: Peter Meerwald, Elsbethen (AT); Erich Hoepoldseder, Anif (AT); Doris Freregger, Vienna (AT); Bernhard Standl, Laufen (DE)

(73) Assignee: Sony DADC Austria AG, Anif (AT)

( * ) Notice: Subject to any disclaimer, the term of this patent is extended or adjusted under 35 U.S.C. 154(b) by 1171 days.

(21) Appl. No.: 10/602,790

(22) Filed: Jun. 23, 2003

(65) Prior Publication Data
US 2004/0070789 A1    Apr. 15, 2004

(30) Foreign Application Priority Data
Jun. 25, 2002    (EP)    ................... 02014178

(51) Int. Cl.
G06F 3/12    (2006.01)
H04N 1/60    (2006.01)
G06K 15/00    (2006.01)

(52) U.S. Cl. .................. 358/1.15; 358/1.9; 358/1.16
(58) Field of Classification Search .................. 358/1.1, 358/1.9, 1.11–1.18
See application file for complete search history.

(56) References Cited

U.S. PATENT DOCUMENTS

| 6,205,452 B1 | 3/2001 | Warmus et al. |
| 6,270,176 B1 | 8/2001 | Kahle |
| 6,363,487 B1 * | 3/2002 | Schneider .................... 726/26 |
| 6,714,209 B2 * | 3/2004 | Van Valer ................... 345/629 |
| 6,903,760 B2 * | 6/2005 | McFarland et al. .......... 347/225 |

FOREIGN PATENT DOCUMENTS

| CN | 1327190 (A) | 12/2001 |
| EP | 1 014 255 | 6/2000 |
| EP | 1 162 823 A2 | 12/2001 |
| EP | 1 168 153 | 1/2002 |
| JP | 2001-261131 | 9/2001 |
| JP | 2002-118740 | 4/2002 |

* cited by examiner

Primary Examiner—Thierry L Pham
(74) Attorney, Agent, or Firm—Oblon, Spivak, McClelland, Maier & Neustadt, L.L.P.

(57) ABSTRACT

A method for generating printing data on the basis of which a disk label is creatable includes the steps of a) generating graphic data representing said disk label at a graphic data generating location (2 to 5), b) transforming said graphic data into said printing data at a printing data generating location (2 to 5), wherein said graphic data generating location (2 to 5) and said printing data generating location (2 to 5) are parts of a communication network (6), respectively, wherein steps a) and b) are controlled by a network capable client (3 to 5) being part of said communication network (6).

11 Claims, 6 Drawing Sheets

METHOD FOR GENERATING DISK LABEL PRINT DATA

The invention relates to a method for generating printing data on the basis of which a disk label is creatable, as well as a system for performing said method.

Disk labels are usually created on the basis of printing data. The most difficult part of designing a disk label is therefore the generation process of said printing data. A customer like a producer of a music CD who wants to design a CD-label therefore has to send his design ideas (graphic data in form of electronic files or graphics/drawings printed on paper) to a company/graphic department having the necessary software for generating printing data. The company/graphic department generates the printing data according to the design ideas of the customer. To check if this has been done properly, the printing data is usually visualized in form of hardcopies which are then sent to the customer for approval. If the customer agrees, the printing data is released for the CD-label manufacturing process.

However, this procedure shows the following disadvantages: A lot of time is need in order to transfer the graphic data/hardcopies between the company/graphic department and the customer. Further, since a lot of people are incorporated in the necessary processes of approval and exchanging graphic data/hardcopies between the company/graphic and the customer, there is a high danger of possible errors which may occur during said processes.

It is an object of the present invention to provide a method for generating printing data usable for creating disk labels which avoids the problems discussed above, i.e. which facilitates the printing data generating process.

According to the present invention, a method for generating printing data on the basis of which a disk label is creatable comprises the steps of:
(a) generating graphic data representing said disk label at a graphic data generating location, and
(b) transforming said graphic data into said printing data at a printing data generating location, said method being characterized in that said graphic data generating location and said printing data generating location are parts of a communication network, respectively, wherein steps (a) and (b) are controlled by a network capable client being part of said communication network.

"Graphic data" here means any possible representation of graphics/drawings/pictures like JPEG-data, bmp, tiff or simply coordination signals/keyboard inputs which are generated in conjunction with a designing process.

"Printing data" here means any picture format (like JPEG, bmp, tiff, CYMK, postscript or the like) which can directly be used by a printer to generate CD-labels. The graphic data and the printing data may be identical.

This method shows the following advantages:
The danger of error sources is reduced since only one person (user of the network capable client) is needed for generating both the graphic data and the printing data.
A lot of time can be saved since the transfer (if necessary at all) of the graphic data from the graphic data generating location to the printing data generating location can be performed via a communication network. Thus, time consuming transfers of graphic data/graphics via mail are no longer necessary.
The process of generating printing data can be initiated/controlled/performed from/at any location. The only requirement is that the client used to control/initiate/perform those tasks is connected to a corresponding network which links the client with the company manufacturing said disks. In the case where steps a) and or b) are initiated/controlled/performed by said client on an applet basis, a corresponding applet-plug in is needed on the client side.
It is possible to secure that the printing data is generated according to the specifications of the company manufacturing said disks, in particular the physical size of the disk, e.g. CD-ROM, and an inner ring specification, e.g. printing areas and areas where printing is not allowed in the middle of the disk. To do this, the company may offer all necessary software needed to create the printing data on a server being part of the communication network, said software being structured in a way that only printing data conforming with desired specification is allowed to be generated.

In a preferred embodiment, the communication network includes the Internet and/or an Intranet.

The graphic data generating location and the printing data generating location may, for example, be both located on the network capable client. For this purpose, the client (for example a Personal Computer) may for example store within a memory unit graphic data generating software like a drawing program as well as a printing data generating software like a conversion program which transforms an output of said graphic data generating software (graphic data) into the desired printing data. Alternatively, the graphic data generating location and the printing data generating location may both be located on a server also being part of the communication network. In this case, the processes of generating graphic data/printing data are not performed within the client itself, but are initiated to be executed on the remote server on the basis of remote controlling capabilities of the client (for example, browser or telnet functionality). Another possible solution is to separate the graphic data generating location from the printing data generating location, for example to assign the graphic data generating location to the network capable client, and to assign the printing data generating location to the network capable server. In this case, the graphic data is produced on the client and then transferred via the communication network to the server, where the graphic data is transformed into the printing data. In the case where the data format of the graphic data is already identical with the data format of the printing data, a transformation step (graphic data to printing data) might not be necessary, in particular, if also the specifications of the company manufacturing the disks are fulfilled. Preferably, the server is located within the company which manufactures the disk labels.

As a consequence, the separation between the graphic data generating location and the printing data generating location effectively does not exist for the customer, since all processes seem to be performed at one location (which can be accessed by the man machine interface of the client) from the customers view.

In a preferred embodiment, the graphic data is visualized to the user of the client on a low dpi value basis, whereas the printing data derived from the graphic shows a high dpi value. If, for example, the user of the client uses the mouse to draw a line on the screen of a display of the client, the coordination signals of the mouse (graphic data) are visualized on the display as a line having a low dpi value, whereas internally the coordination signals of the mouse are simultaneously transformed into printing data showing a high dpi value (the high dpi value is needed for manufacturing disk labels). Preferably, said low dpi value is about 72 dpi (usual monitor resolution), whereas said high dpi value is about 300 to 360 dpi, but may also be higher, e.g. with future development of printers. This automatism has the advantage that no errors can occur during the process of transforming said graphic data into printing data; the graphic data is stored in terms of printing data (high dpi value) and only visualized on a low dpi value basis. At the end of the designing process the artwork may be scaled in order to increase the dpi number to e.g. 360.

As already mentioned above, the term "printing data" means any picture format which can be directly used by a printer to generate CD-labels (for example JPEG, CYMK, postscript or the like). In order to be more flexible, the printing data may be adapted to different printing units by respective printing data conversion processes which convert the printing data from a first printing data format to a second printing data format, respectively. For example, printing data being available in form of postscript data may be converted into printing data showing the CYMK-format. This allows to use different printing machines requiring different kinds of printing data. This adapting process may be performed automatically or manually.

Preferably, the printing data comprises postscript data or picture data of any other picture formats.

In a preferred embodiment, all steps being performed by a user intending to generate graphic data which can not be assigned to predefined CD-label printing areas are blocked during step a).

In order to perform above-described process, the present invention provides a network capable client having means for locally and/or remotely controlling/performing all processes needed for generating printing data on the basis of which a disk label is creatable.

Preferably, the client comprises/runs a browser means (for example Netscape Communicator) for visiting remote websites and for using functionality offered by these remote websites. For example, the browser means may be capable of using applets (e.g. shockwave applets) being offered by the website, wherein the applets then serve as the basis for controlling/performing the processes needed for generating printing data. For example, the applet may contain the graphic data generating software as well as the printing data generating software mentioned above. However, the means for locally and/or remotely controlling/performing the processes for generating printing data may also be constituted by a "normal" piece of software which can be installed on the client and afterwards be executed on the client's side. The finished image-file can be downloaded in order to be saved on a disc or any other device.

The client preferably comprises/runs a drawing tool (graphic data generating software) allowing a user to generate graphics/pictures/drawings corresponding to the desired disk label which may be a standard drawing tool like PhotoShop, Corel Draw or a drawing tool specialized on creating disk labels. The drawing tool visualizes the graphics/pictures/drawings on a low dpi value basis. Advantageously, the client also comprises/runs means for generating printing data (printing data generating software) corresponding to said graphics/pictures/drawings on a high dpi value basis. In a preferred embodiment, the graphic data generating software (drawing tool) is part of said applet/downloadable software.

Advantageously, the client comprises means for exporting printing data generated on the client's side to a remote server.

The client may comprise means allowing the user only to generate drawings which fit into predefined CD-label printing areas.

The present invention further provides a network capable server offering functionality directly usable by a remote client on said server and/or installable on said remote client in order to be remotely used, which is characterized in that said functionality is adapted to locally and/or remotely controlling/performing all processes needed for generating printing data on the basis of which a disk label is creatable.

In other words, the server may either offer software running on the server itself but being remotely controlled by the network capable client described above, or offer software being downloadable to be executed on the client side. The software may include all software tools being necessary to generate said printing data or only a part of these software tools.

The server preferably hosts functionality allowing a web browser running on a remote client to access said offered functionality. The functionality is preferably provided in form of applets which can be used in conjunction with a web browser. The server further may comprise functionality for receiving printing data remotely generated by the remote client. Thus, the "interface" between the software needed to generate the printing data and the remote client/user which uses this software can be provided in form of a website.

Further, the present invention provides a system for performing all processes needed for generating printing data on the basis of which a disk label is creatable, which is characterized by a network capable client according to the present invention and a network capable server according to the present invention, wherein said network capable client and said network capable server are connected with each other via a communication network. Preferably, the communication network comprises the Internet and/or an Intranet.

Further, a computer program product having computer product means adapted to perform/embody the inventive method or any step thereof is provided, which also may be designated as web capable disk label design tool.

Last, a computer readable storage means storing thereon a computer program product having computer product means adapted to perform/embody the inventive method or any step thereof is provided.

For a better understanding of the invention, further features and embodiments thereof will be explained below by way of example while making reference to the accompanying drawing, wherein.

Figure 1:
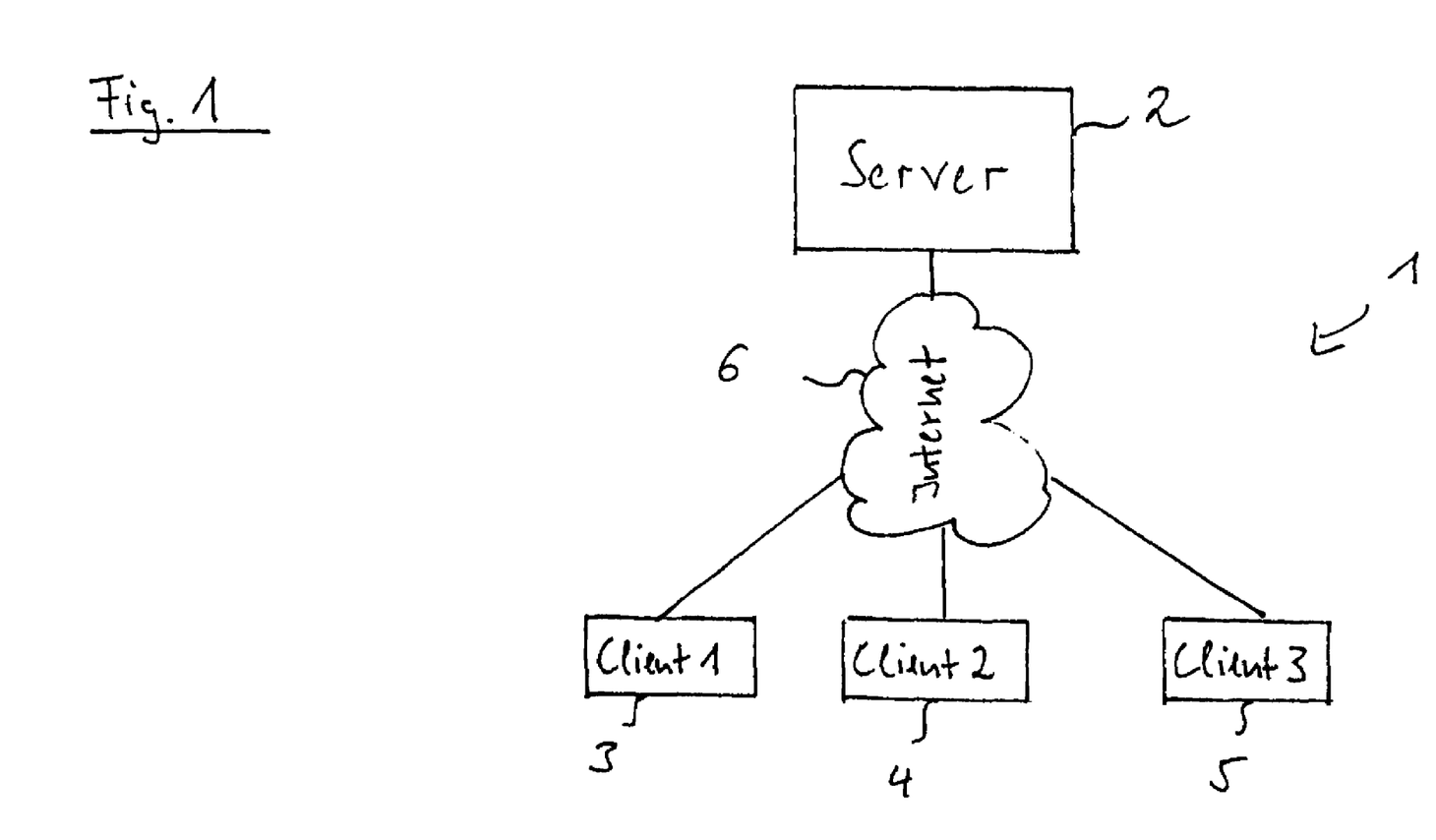
FIG. 1 shows a preferred embodiment of a system for generating printing data according to the present invention.

A system 1 comprises a network capable server 2, a first network capable client 3, a second network capable client 4, a third network capable client 5, and a communication network 6 (here: the Internet), wherein the Internet 6 connects each client 3 to 5 with the server 2.

In the following, it is assumed that a user of the first client 3 wants to generate printing data for a disk label. To do this, he uses network capabilities of the first client 3, for example a web browser, to establish a connection to the server 2 via the Internet 6. The server 2 hosts a website in which a (shockwave) applet is included, said applet comprising all software components/functionality needed for generating the desired graphic/printing data. The user then may download the applet hosted by the server 2 via the Internet 6 in order to execute it on the first client 3. Alternatively, the applet may be executed on the server 2. If the user generates the printing data on the client's side, the printing data has to be transferred back to the server 2 via the Internet 6. The company manufacturing the disk labels then uses the printing data received by the server 2/generated on the server 2 in order to create the disk labels. Respective printing data generating processes controlled/initiated/performed by the second client 4 or the third client 5 are done in an analogous manner.

The inventive system 1 described above has the advantages that the time for generating the printing data is very short, since the transmission of the applet to the client (if necessary at all) as well as the transmission of the printing data from the client 3 back to the server 2 can be performed very quickly (the typical size of a printing data file is dependent on the format and resolution and might range from 200 kilobyte to 10-20 MB, e.g. 2 MB). Further, no approvals are necessary since the graphic data/printing data is generated by the user itself and not by a separate graphic department. Thus, the user can immediately see if his created printing data corresponds to his ideas. In addition, possible errors are reduced since only one person is involved in the process of generating the printing data. Also, the only hardware requirement for the user is to have a network capable (Internet capable) client like a PC having Internet access. Last, since the printing data is generated by the applet which is programmed by the company manufacturing the disk labels, the company has the possibility to design the applet in a way that only printing data corresponding to desired specifications is allowed to be generated by a user. That is, the printing data is in exactly the format which is required for the actual manufacturing process.

In the following, a preferred embodiment of the software components used for generating the printing data will be explained.

As already mentioned, the software components (graphic data generating software and printing data generating software) are preferably available in form of an applet. The printing data is preferably generated as postscript file or picture file. Each software component contains functions which can be changed independently from functions of another software component.

It is possible to perform settings/pre-selections of parameters, which can be defined by the user at the beginning of the printing data generating process. These settings/pre-selections have an influence on the whole generating process and should therefore preferably be done at the beginning of the printing data generating process. However, these settings/pre-selections can also be done during the printing data generating process.

Basically, there are two different categories of settings/pre-selections: The first setting category concerns the shape of the disk: for example it is distinguished between different categories of disks like CD-ROMs, DVDs (Audio DVD-R, DVD-RW), MiniDisks or the like, since each different type of disk may show different areas which are allowed or not allowed to be labeled. Further, within each category, it may be distinguished between different types of disks. According to the selected category/type of disk, the user is for example allowed/not allowed to create a CD-label which covers the inner ring of a CD which is not used for recording data. More generally, a basic principle of the software components is customization. That is, operations of the user which might lead to useless printing data are recognized and blocked by the software components. The second setting/pre-selection categories concerns the color system used by the software components. Since in this embodiment the printing data has to be available in terms of the CMYK-color-model, the color system is restricted to the colors available within this model. However, the user can also define colors to be exclusively used for the design/layout of the disk label.

The colors can be defined with the help of sliders or keyboard inputs. The selection of colors is limited to those which had been defined within the color system described above. This limitation avoids errors. The presentation of colors at the display of the clients is done on the basis of the RGB-color-model, i.e. all entries which have been done within the CMYK model are transformed into the corresponding RGB-value in order to be visualized at the display of the client. The colors being generated by the user may be stored within a library, which enables the user to retrieve generated/used colors, which avoids the effort of generating/mixing them another time.

The software components provide three tools to the user. Accordingly, also three tool modification menus are available. The selection of one tool invokes the respective tool modification menu and presents it to the user. Within these tool modification menus, settings/pre-adjustments according to the user's wishes can be done. Each tool corresponds to one mode, which means that each user exclusively gets those settings/pre-adjustments needed for the respective tool. This function facilitates the handling of the tools and the understanding of the respective functions. Of course, it is possible for the user to change the mode/tool at any time. If the user does this, the parameters, of course, also change. The handling mechanism of the three tools is in the following referred to as "action tool".

The first tool provided by the action tool is a "selection tool": This tool is used to select a generated graphic object (to activate said object). This tool is needed since modifications at the object can only be done if the object is activated. Possible modifications of the object are movements as well as enlargement-reduction processes of the object. Further, the transparence of the object can be changed.

A second tool provided by the action tool is the "shape tool": On the basis of this tool geometrical shapes (square, rectangle, circle, etc.) can be generated.

A third tool provided by the action tool is a "text tool": This tool provides the possibility to generate texts and to determine the layout of those texts (style and size of the text, bold text, underlined text, orientation of the text, line distance, etc.).

Further functions provided by the software components are:

Grid button: This button enables the user to fade-in/out predefined grids.

Help button: This button enables the user to get access to a help file which contains explanations about the single functions.

Ready button: This button enables the user to terminate the printing data generating process. If the user presses this button, the current created label will be graphically shown in a preview window.

Preview: If the user presses an OK-button within said preview window, the corresponding printing data will be sent to a server/stored as final printing data. If the user presses a CANCEL-button, he returns back to the printing data generation process.

Figure 2:
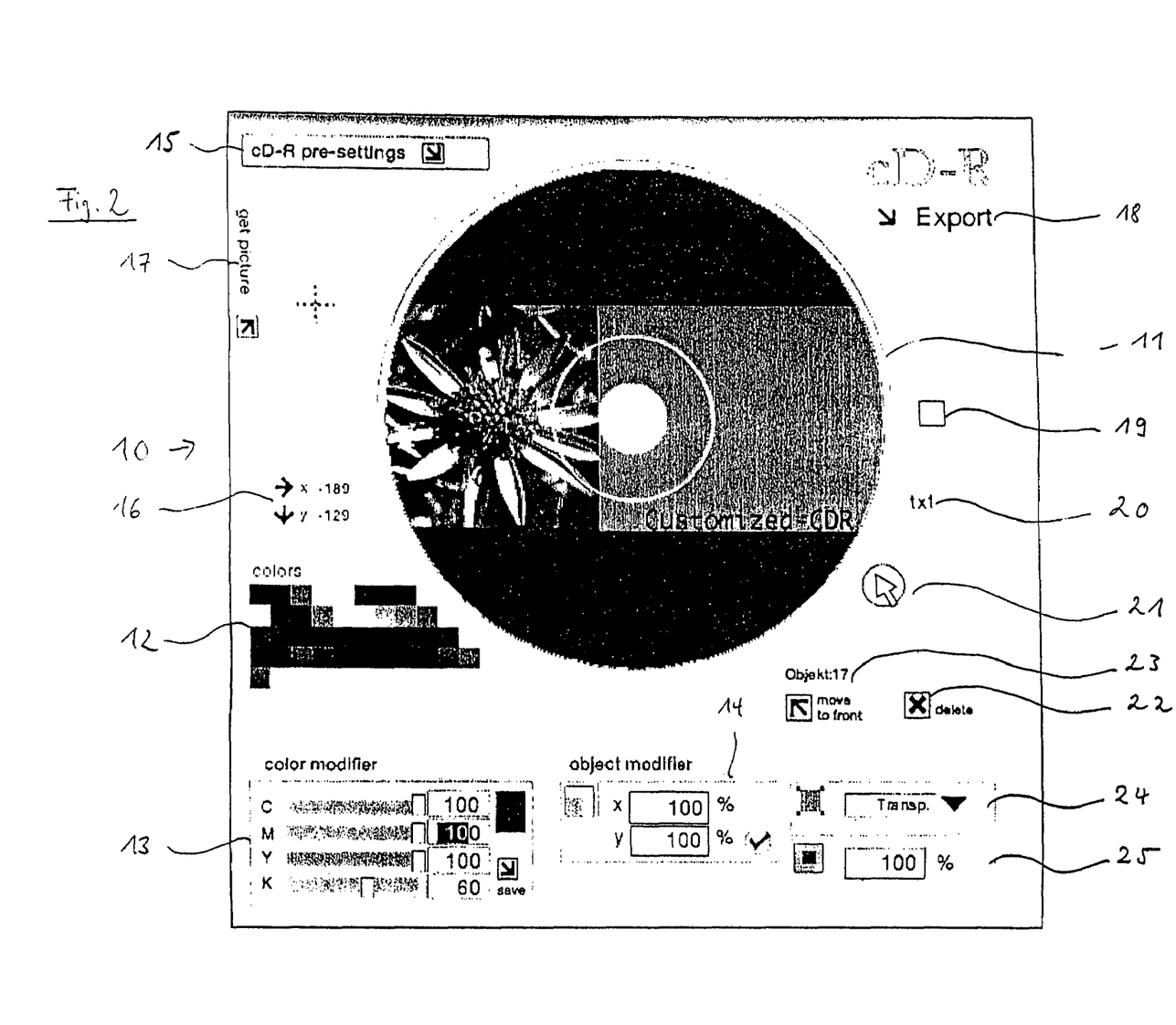
FIG. 2 shows a preferred embodiment of a GUI (Graphical User Interface) of a graphic data generating software according to the present invention.

In the following, making reference to FIG. 2, a preferred embodiment of a graphical user interface of a graphic data generating software according to the present invention will be explained.

A graphical user interface (GUI) 10 shows a CD-label area 11 with a preview of the currently designed CD label, a first color adjusting means 12 for choosing different possible colors, a second color adjusting means 13 for modifying the colors according to the CMYK color model which also includes a possibility for saving the modified color settings, an object modifying means 14 for modifying the size of a selected object, a presetting means 15 to choose one of different printing areas according to the specifications of the CD manufacturer, positioning indicating means 16 indicating the position of an object or a pointer in the CD-label area 11, picture loading means 17 for importing one or more pictures to be included on the CD label, e.g. the shown sunflower in the CD-label area 1, a export means 18 for exporting a generated CD label, an object insertion means 19, a text insertion means 20, a pointer activation means 21, an object deleting means 21, an object activation means 23 which allows to move an object to the front, i.e. the top layer, an object characteristic selecting means 24 to select one of different object characteristics, like transparency, and an object characteristic setting means 25 to set/change the object characteristic selected by the object characteristic selecting means 24.

Figure 3:
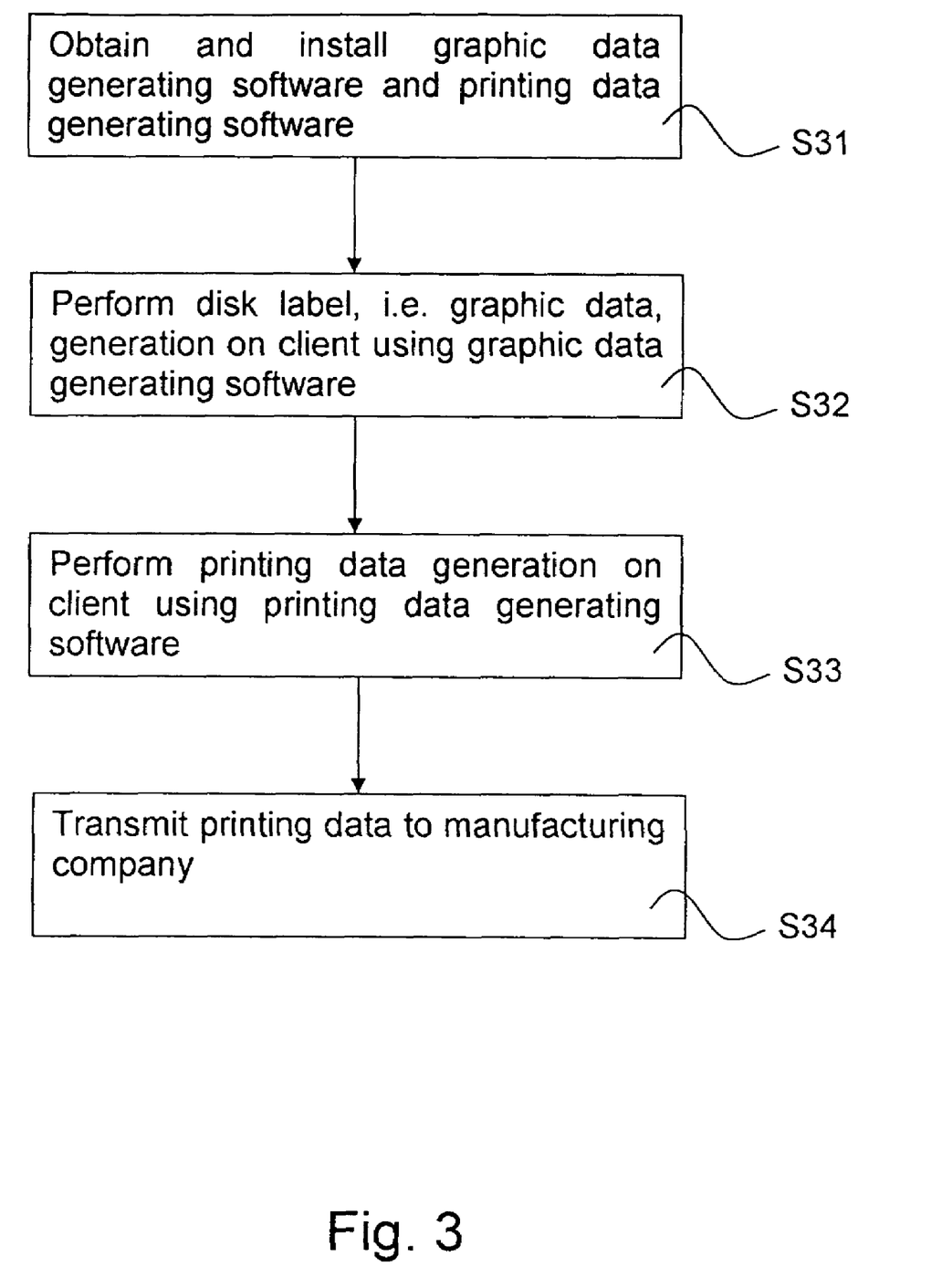
FIGS. 3-5 show flowcharts of different preferred embodiments to perform the graphic data generation and printing data generation according to the present invention.

FIG. 3 shows a flowchart of a first preferred embodiment to perform the graphic data generation and printing data generation according to the present invention. In this case the graphic data generating location and the printing data generating location are both located on the network capable client. For this purpose, in a first step S31 graphic data generating software and printing data generating software are obtained and installed, e.g. by loading an applet from a server, e.g. through the internet, or by installing a software that is distributed by the CD manufacturer. The client (for example a Personal Computer) then stores within a memory unit the graphic data generating software like a drawing program as well as the printing data generating software like a conversion program which can transform an output of said graphic data generating software (graphic data) into the desired printing data. In a following second step S32 the disk label generation is performed by the user with the graphic data generating software on the client. Thereafter, in a third step S33 the printing data generation is performed on the client by executing the printing data generating software. Finally, in a following fourth step S34 the printing data gets transmitted to the manufacturing company.

Figure 4:
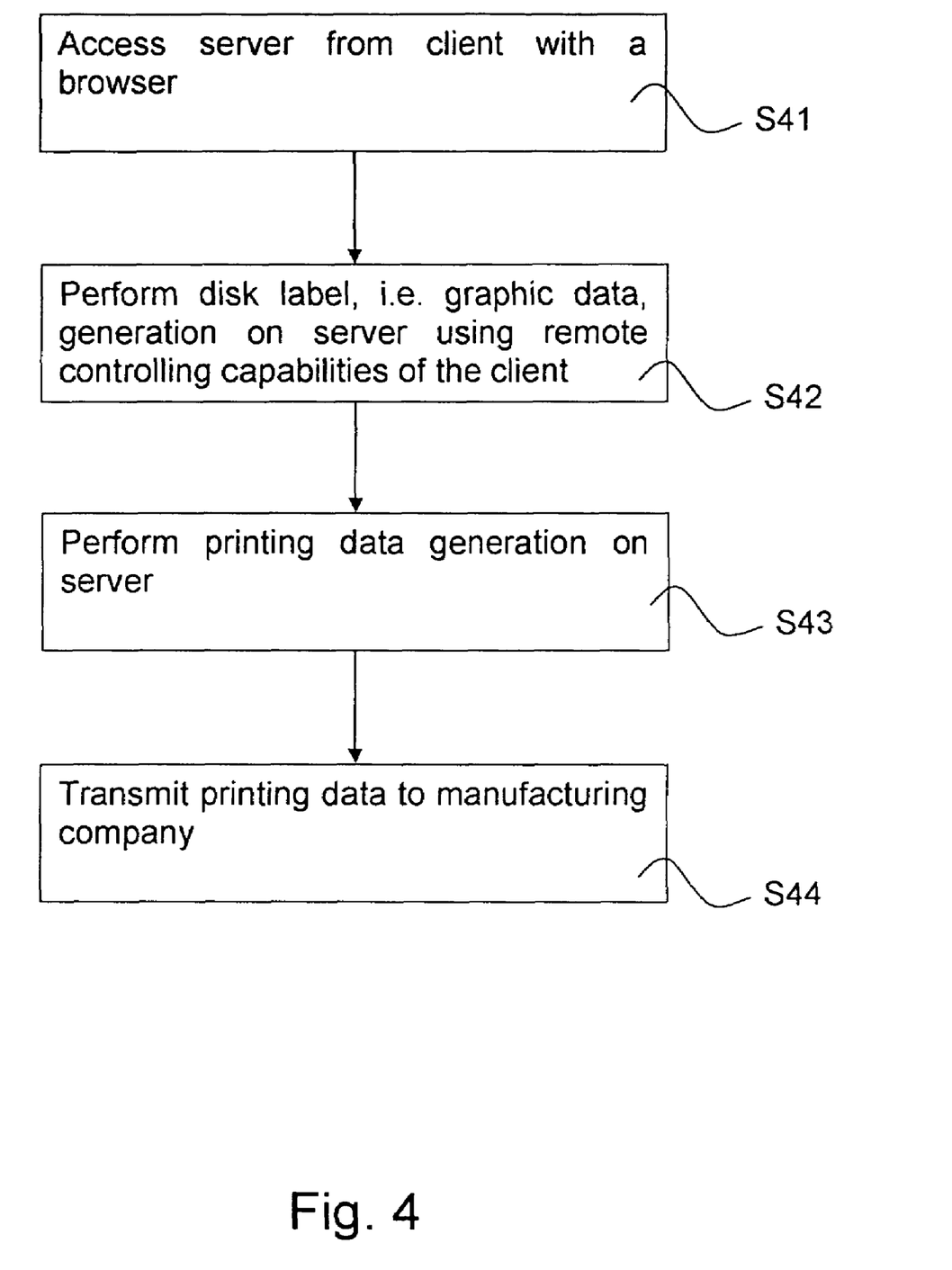

FIG. 4 shows a flowchart of a second preferred embodiment to perform the graphic data generation and printing data generation according to the present invention. In this case the graphic data generating location and the printing data generating location are both located on a server also being part of the communication network. In this case, the processes of generating graphic data/printing data are not performed within the client itself, but are initiated to be executed on the remote server on the basis of remote controlling capabilities of the client (for example, browser or telnet functionality). For this purpose, in a first step S41 the server is accessed from the client, e.g. with a browser. In a following second step S42 the disk label generation is performed by the user with the graphic data generating software on the server using the remote controlling capabilities of the client. Thereafter, in a third step S43 the printing data generation is performed on the server by executing the printing data generating software. Finally, in a following fourth step S44 the printing data gets transmitted to the manufacturing company. This last step might not be necessary in case the server is located within the manufacturing company itself, in which case it is also possible that the printing data will be automatically forwarded or directly transmitted to the CD-label manufacturing process, e.g. the printer that generated CD-labels.

Figure 5:
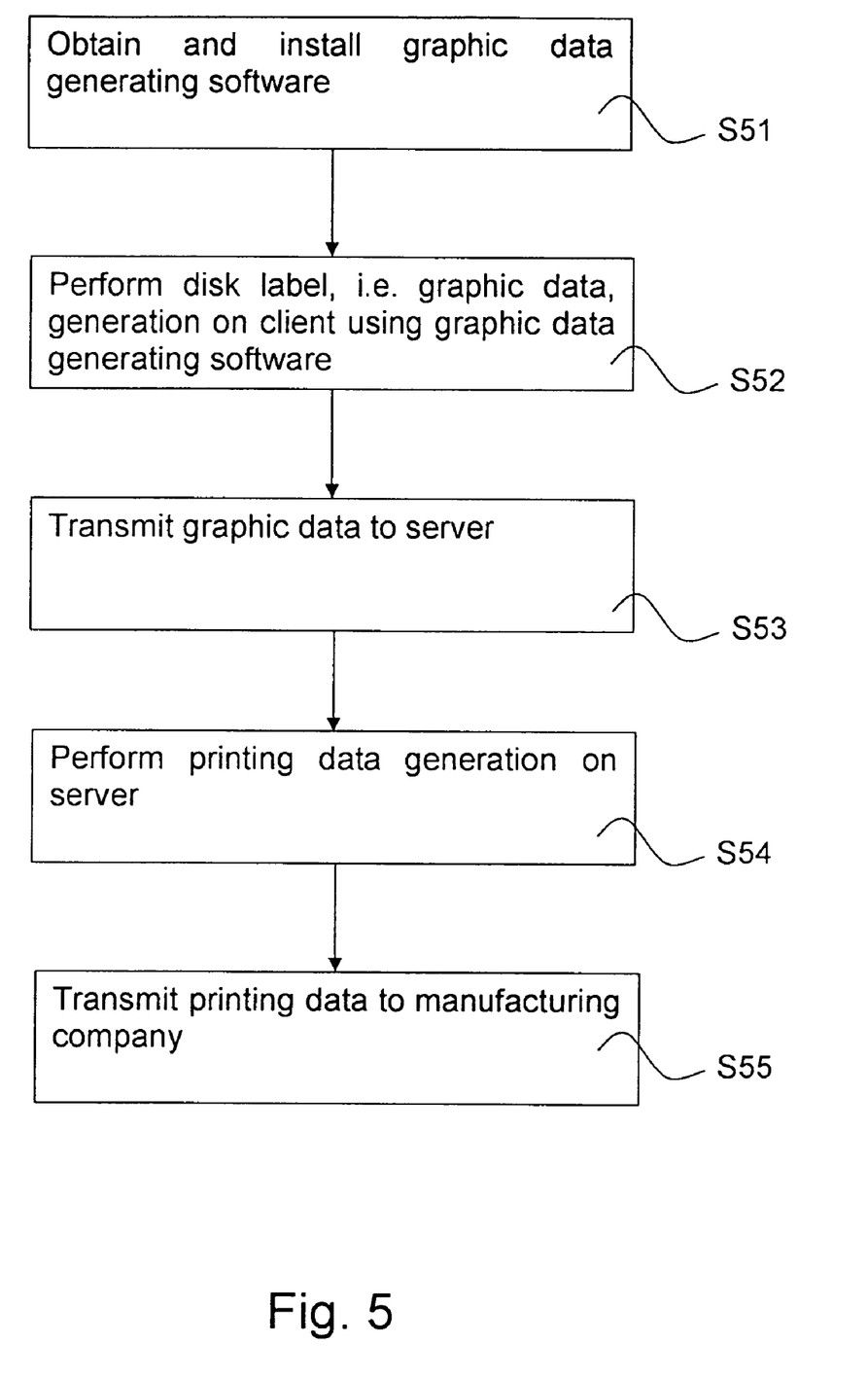

FIG. 5 shows a flowchart of a third preferred embodiment to perform the graphic data generation and printing data generation according to the present invention. In this case the graphic data generating location is separated from the printing data generating location. For example the graphic data generating location is assigned to the network capable client, and the printing data generating location is assigned to the network capable server. In this case, the graphic data is produced on the client and then transferred via the communication network to the server, where the graphic data is transformed into the printing data. For this purpose, in a first step S51 graphic data generating software is obtained and installed, e.g. by loading an applet from a server, e.g. through the internet, or by installing a software that is distributed by the CD manufacturer. The client (for example a Personal Computer) then stores within a memory unit the graphic data generating software like a drawing program. In a following second step S52 the disk label generation is performed by the user with the graphic data generating software on the client. Thereafter, in a third step S53 the graphic data is transmitted to the server where the printing data generation is performed by executing the printing data generating software in a following fourth step S54. Finally, in a following fifth step S55 the printing data gets transmitted to the manufacturing company. As before in the second preferred possibility to perform the graphic data generation and printing data generation according to the present invention, this last step might not be necessary in case the server is located within the manufacturing company itself, in which case it is again also possible that the printing data will be automatically forwarded or directly transmitted to the CD-label manufacturing process, e.g. the printer that generated CD-labels.

Figure 6:
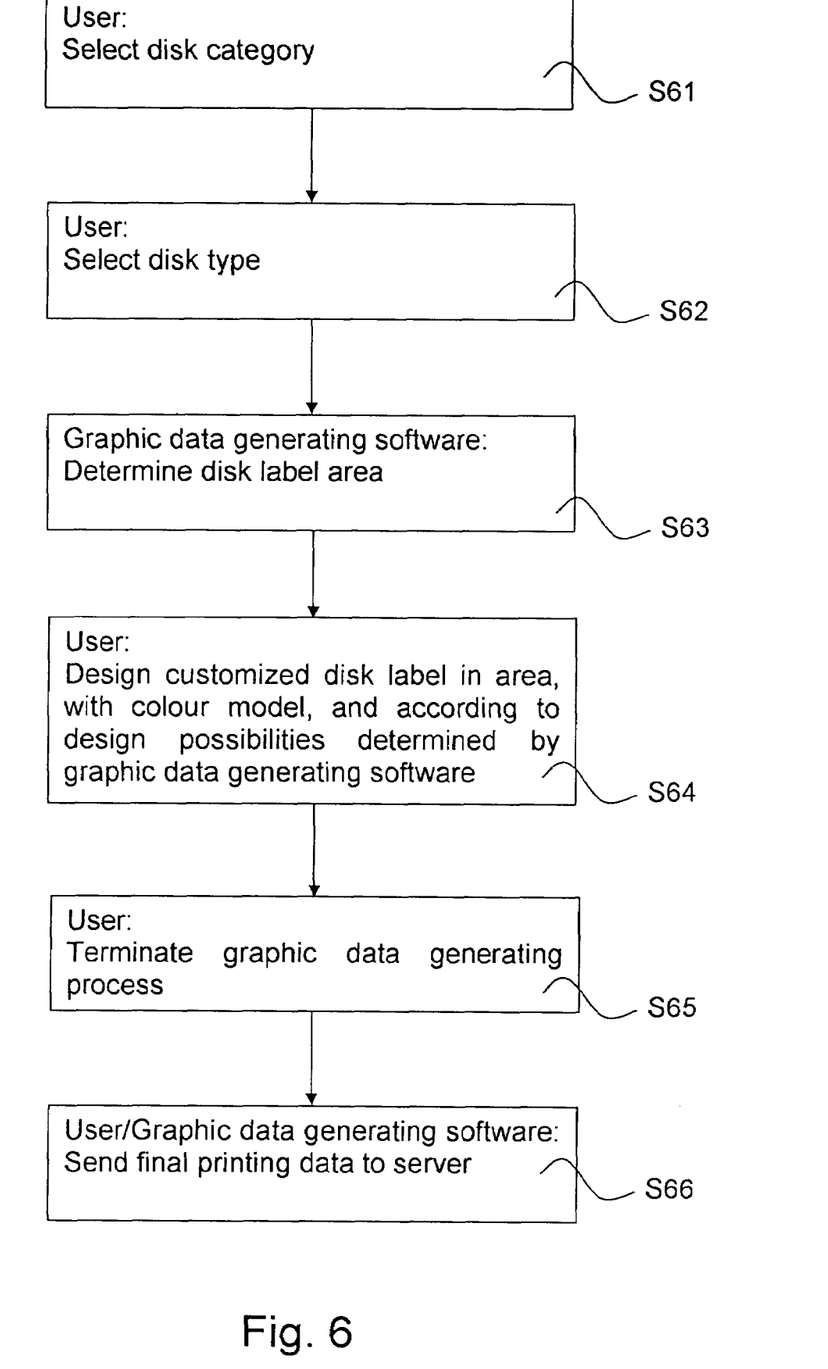
FIG. 6 shows a detailed flowchart of the graphic data generation according to a preferred embodiment according to the present invention.

FIG. 6 shows a detailed flowchart of the graphic data generation according to a preferred embodiment of the present invention, e.g. as it might be performed in the second and third steps S52 and S53 of the third preferred embodiment to perform the graphic data generation and printing data generation according to the present invention. In a first step S61 the user selects a disc category, e.g. according to a list specified within the graphic data generating software. Thereafter, in a second step S62 the user selects a disk type, e.g. also according to a list specified within the graphic data generating software. Following these selection steps, the graphic data generating software determines the disk label area for the selected disk category and type in a third step S63. Thereafter, in a fourth step S64, the user designs his/her customized disk label in the area, with the colour model and according to the design possibilities determined by the graphic data generating software. After this is finished the user terminates the graphic data generating process in a fifth step S65 and, e.g. based on a user command or automatically the graphic data generating software sends the final printing data to the server in a following sixth step S66.

The invention claimed is:

1. A system for performing processes used for generating printing data on the basis of which a disk label is creatable, comprising:

a network capable client configured to locally control/perform said processes used for generating printing data on the basis of which a disk label is creatable, the generated printing data at the client being presented to a user at a first resolution; and a network capable server configured to offer functionality directly usable and installable on said network capable client, wherein said functionality is adapted to locally control/perform said processes used for generating printing data on the basis of which said disk label is creatable, wherein said network capable client and said network capable server are connected with each other via a communication network, wherein said printing data are generated based on graphic data representing said disk label, wherein, in advance of finalizing said graphic data for said disk label, a disk label printing area is determined in dependence on selection by a user of a disk category and a disk type, wherein said disk category defines overall dimensions for disks of each disk category, and wherein from said disk type, areas within a disk that are not allowed to be covered by said disk label are derivable and are prohibited from being labeled for said disk category, and wherein, during the process of generating said graphic data all instructions recognized as leading to the generation of printing data which cannot be assigned to the determined disk label printing area are blocked, the server being configured to process the printing data of the first resolution and to rescale it into printing data of a second, higher resolution.

2. The system according to claim 1, wherein the network capable client is configured to download an applet from the network capable server, and the applet is used in conjunction with a web browser to select the disk category and disk type in order to generate the graphic data for the disk label.

3. The system according to claim 1, wherein printing data remotely generated by said network capable client is received.

4. The system according to claim 1, wherein said communication network comprises the Internet and/or an Intranet.

5. The system according to claim 1, wherein said graphic data are generated by a graphic tool, which is part of an applet, having a drawing functionality.

6. A method for performing processes used for generating printing data on the basis of which a disk label is creatable, comprising:
  locally controlling/performing said processes used for generating printing data on the basis of which a disk label is creatable, the generated printing data at a network capable client being presented to a user at a first resolution;
  offering functionality directly usable by said network capable client and installable on said network capable client, wherein said functionality is adapted to locally control/perform said processes used for generating printing data on the basis of which a disk label is creatable at said network capable client, wherein said network capable client and a network capable server are connected with each other via a communication network;
  generating, at said network capable client said printing data based on graphic data representing said disk label; and
  determining, at said network capable client and in advance of finalizing said graphic data for said disk label, a disk label printing area in dependence on selection by a user of a disk category and a disk type, wherein said disk category defines overall dimensions for disks of each disk category, and wherein from said disk type, areas within a disk that are not allowed to be covered by said disk label are derivable and are prohibited from being labeled for said disk category, wherein during the process of generating said graphic data all instructions recognized as leading to the generation of printing data which cannot be assigned to the determined disk label printing area are blocked, the server being configured to process the printing data of the first resolution and to rescale it into printing data of a second, higher resolution.

7. A computer readable medium encoded with a computer program containing instructions configured to cause a processor-based device to execute the method of claim 6.

8. The method according to claim 6, wherein said communication network comprises the Internet and/or an Intranet.

9. The method according to claim 6, wherein said graphic data are generated by a graphic tool, which is part of an applet, having a drawing functionality.

10. The method according to claim 6, wherein the determining comprises downloading an applet from the network capable server, and executing the applet by a web browser to allow the user to select the disk category and disk type in order to generate the graphic data for the disk label.

11. A system for performing processes used for generating printing data on the basis of which a recordable data storage medium label is creatable, comprising:
  a network capable client configured to locally control/perform said processes used for generating printing data on the basis of which a recordable data storage medium label is creatable, the generated printing data at the client being presented to a user at a first resolution; and
  a network capable server configured to offer functionality directly usable and installable on said network capable client, wherein said functionality is adapted to locally control/perform said processes used for generating printing data on the basis of which said recordable data storage medium label is creatable, wherein said network capable client and said network capable server are connected with each other via a communication network, wherein said printing data are generated based on graphic data representing said recordable data storage medium label, wherein, in advance of finalizing said graphic data for said recordable data storage medium label, a recordable data storage medium label printing area is determined in dependence on selection by a user of a recordable data storage medium category and a recordable data storage medium type, wherein said recordable data storage medium category defines overall dimensions for recordable data storage mediums of each recordable data storage medium category, and wherein from said recordable data storage medium type, areas within a recordable data storage medium that are not allowed to be covered by said recordable data storage medium label are derivable and are prohibited from being labeled for said recordable data storage medium category, and wherein, during the process of generating said graphic data all instructions recognized as leading to the generation of printing data which cannot be assigned to the determined recordable data storage medium label printing area are blocked, the server being configured to process the printing data of a first resolution and to rescale it into printing data of a second, higher resolution.

* * * * *